(12) United States Patent
Tani

(10) Patent No.: US 6,402,129 B1
(45) Date of Patent: Jun. 11, 2002

(54) AIR DAMPER

(75) Inventor: Hideo Tani, Niihama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/623,663

(22) PCT Filed: Mar. 13, 2000

(86) PCT No.: PCT/JP00/01519
§ 371 (c)(1),
(2), (4) Date: Sep. 6, 2000

(87) PCT Pub. No.: WO00/55522
PCT Pub. Date: Sep. 21, 2000

(30) Foreign Application Priority Data

Mar. 15, 1999  (JP) ............................................... 11-68996

(51) Int. Cl.[7] .................................................. F16M 1/00
(52) U.S. Cl. ........................................ 267/136; 267/153
(58) Field of Search ........................ 267/122, 136–153; 188/298; 248/632–638

(56) References Cited

U.S. PATENT DOCUMENTS

| 1,884,477 | A | | 10/1932 | Wood | |
|---|---|---|---|---|---|
| 3,014,563 | A | | 12/1961 | Bratton | |
| 3,128,999 | A | * | 4/1964 | Schmitt | 267/153 |
| 3,831,923 | A | * | 8/1974 | Meldrum | 267/141 |
| 4,066,058 | A | | 1/1978 | Anderkay | |
| 4,407,491 | A | * | 10/1983 | Kunihiro et al. | 267/140.1 |
| 4,858,880 | A | * | 8/1989 | Durand | 248/635 |
| 4,974,820 | A | * | 12/1990 | Nakanishi | 267/152 |

FOREIGN PATENT DOCUMENTS

DE         78 17 348         6/1978

OTHER PUBLICATIONS

Patent Abstracts of Japan, Publication No.: 05159552, Publication Date: Jun. 25, 1993., Insulator.
Patent Abstracts of Japan, Publication No.: 58131444, Publication Date: Aug. 05, 1983, Setting Device for Instrument.

* cited by examiner

*Primary Examiner*—Christopher P. Schwartz
(74) *Attorney, Agent, or Firm*—Pearne & Gordon LLP

(57) ABSTRACT

A casing is composed of two hollow members which are made of an elastic material and stacked in a manner of one above the other. When the casing is mounted on a frame of a body of equipment with a shoulder bolt, the hollow members are made airtight. A support board for supporting a precision electronic and mechanical component is mounted between two hollow members

15 Claims, 7 Drawing Sheets

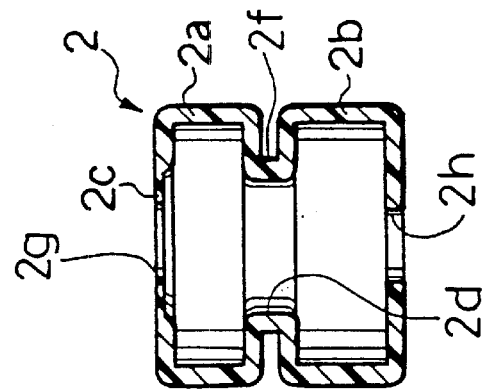
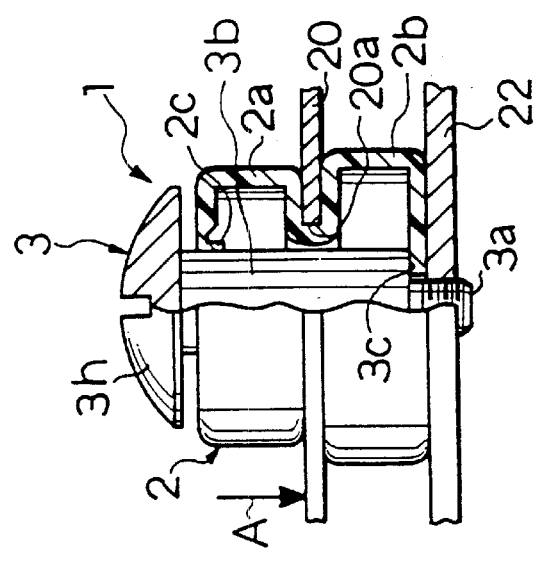
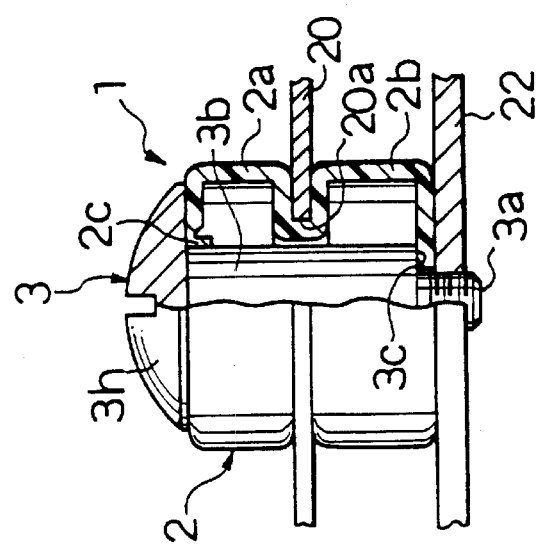

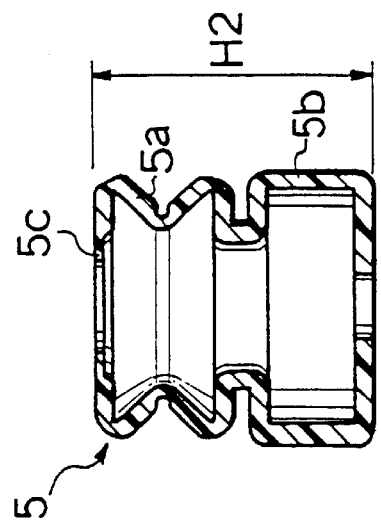
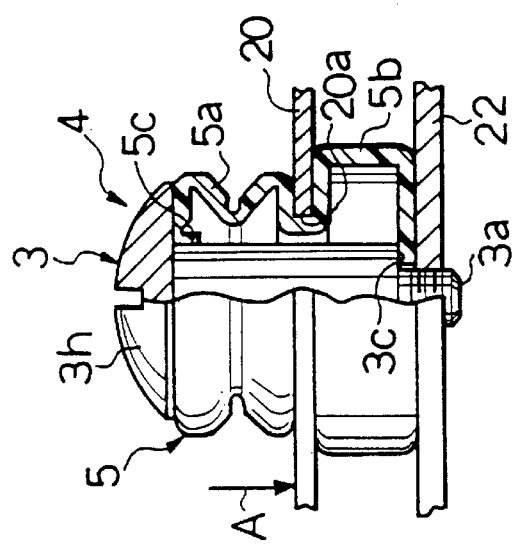
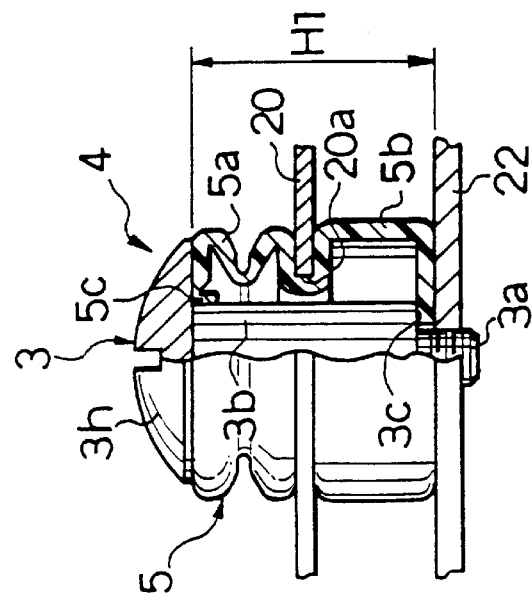

AIR DAMPER

TECHNICAL FIELD

The present invention relates to an air damper to prevent extraneous vibration and shock from transmission to a precision electronic and mechanical component incorporated in a body of equipment.

BACKGROUND ART

In recent years, a precision electronic and mechanical component including a magnetic disc device, a DVD (digital versatile disc) or CD (compact disc) drive is intended to reduce in size and weight and to configure as one unit so as to be suitable for portable use. In the precision electronic and mechanical component, in order to improve a vibration-proof characteristic or a shock-proof characteristic, the component is commonly suspended in a body of equipment by using a shock absorbing member such as an air damper.

An air damper in the prior art is disclosed in the Japanese published unexamined patent application Hei 5-159552, for example. The air damper in the prior art comprises an outer casing of which two tire-shaped members are stacked in a manner of one above the other in the axial direction. The outer casing includes a compression coil spring therein. A driving section housing provided with the precision electronic and mechanical component to be supported is inserted in a constricted part formed between two tire-shaped members, thereby holding. The upper face and the lower face of the outer casing are in contact with a subframe and a support frame which are fixed to the body of equipment, respectively, and the outer casing is mounted between the subframe and the support frame with a shank having threads. The outer casing has a projection on the inner wall to configure an auxiliary damping structure in operative connection with the shank.

In the prior art, when extraneous vibration is transmitted to the air damper from the body of equipment through the subframe and the support frame, the outer casing and the compression coil spring deform, thereby absorbing the vibration. Additionally, the outer casing is made airtight by the subframe, the support frame and the shank, and the vibration is also absorbed by a cushiony action of air in the airtight outer casing. Moreover, the above-mentioned projection deforms in dependence on the moving of the shank, and absorbs the vibration.

In the above-mentioned air damper of the prior art, the compression coil spring is included in the outer casing.

When the frequency of the extraneous vibration is equal to the natural frequency of the compression coil spring, the extraneous vibration is amplituded by resonance and transmitted to the precision electronic and mechanical component to be supported. Once vibration occurs on the compression coil spring, the vibration continues for a while. It is difficult to absorb the vibration within a short period of time. When the amplitude of the extraneous vibration or shock exceeds a predetermined value, the compression coil spring is compressed to the compression limit, and can not absorb any more vibration.

It is difficult to reduce in size and in weight and to simplify the structure of the outer casing because of the existence of the compression coil spring therein. Since the subframe must be provided in the body of equipment in order to make airtight the outer casing, the structure of the body of equipment can not be simplified.

The outer casing of the air damper of the prior art is not directly fixed to the shank. Therefore, a positional displacement is liable to occur between the outer casing and the shank due to an external force such as vibration or shock, and thereby the shank is liable to tilts relative to the outer casing. Consequently, the outer casing, the compression coil spring and the projection are pressed by the tilted shank and result in deformed states. In the above-mentioned states, the air damper can not absorb the vibration and shock.

DISCLOSURE OF INVENTION

An object of the present invention is to provide an air damper which can damp and absorb vibration and shock having large amplitudes, and is reduced in size and in weight.

An air damper of the present invention to be mounted between a support board having an object to be supported and a frame fixed to a body of equipment comprises a casing including at least two hollow members which are made of an elastic material and stacked vertically, and a fastening member. The support board is held between two hollow members of the casing, and the hollow member of a lowest step is in close contact with the frame.

The fastening member is inserted into the casing in the axial direction of both the stacked hollow members, and fixes the casing to the frame so as to make airtight.

According to this configuration, vibration and shock having large amplitudes can be damped and absorbed by utilizing the deformation of the casing and an air spring action of the air enclosed in the casing. Since the air spring is utilized, the air damper is easily reduced in size and weight.

An air damper of another aspect of the present invention comprises a casing of an elastic material, including at least two hollow members connected with an intermediate section having a communication opening, and supporting a support board having an object to be supported. at the intermediate section. One of the hollow members includes a thin walled portion of a predetermined diameter at an end portion thereof, and an upper opening having a diameter smaller than the diameter of the thin walled portion, formed at a central portion of the thin walled portion. The other hollow member includes a lower opening having a diameter smaller than the predetermined diameter at an end. Furthermore, the air damper comprises a fastening member including a shank of the approximately same diameter as the outer diameter of the thin walled portion, a shoulder of a diameter larger than the diameter of the lower opening and threads attached to the shoulder, having a diameter smaller than the diameter of the lower opening.

When the fastening member is attached to the frame so that the shank of the fastening member passes through the upper opening, the communication opening and the lower opening of the casing, the shoulder fixes the periphery of the lower opening to the frame in an airtight manner. Since the diameter of the upper opening is made smaller than the diameter of the shank and the thin walled portion is disposed in the periphery of the upper opening, the thin walled portion is folded inward, and airtightness is maintained between the upper opening and the shank. Since the diameter of the lower opening is made smaller than the diameter of the shoulder of the fastening member, the shoulder presses the periphery portion of the lower opening, and airtightness is maintained between the lower opening and the fastening member.

An air damper of a further aspect of the present invention comprises an air passage to communicate the interior of the casing with the outside in addition to the elements in the above-mentioned configuration.

According to this configuration, in addition to the above-mentioned deformation of the casing and the air spring action, an air-resistance action of the air passing through the air passage improves the absorbing characteristic of the vibration and shock, and the vibration and shock are absorbed within a short period of time.

BRIEF DESCRIPTION OF DRAWINGS

FIG. 2A is a side view, partly in cross-section, of an air damper 1 in a first embodiment of the present invention.

FIG. 2B is a side view, partly in cross-section, of the air damper 1 showing a depressed state thereof.

FIG. 2C is a cross-sectional side view of a casing 2 in FIG. 2A.

FIG. 3A is a side view, partly in cross-section, of an air damper 4 in a second embodiment of the present invention.

FIG. 3B is a side view, partly in cross-section, of the air damper 4 showing a depressed state thereof.

FIG. 3C is a cross-sectional side view of a casing 5 in FIG. 3A.

BEST MODE FOR CARRYING OUT THE INVENTION

Hereinafter, preferred embodiments of the air damper of the present invention are described with reference to FIG. 1 to FIG. 7.

FIRST EMBODIMENT

Figure 1A:
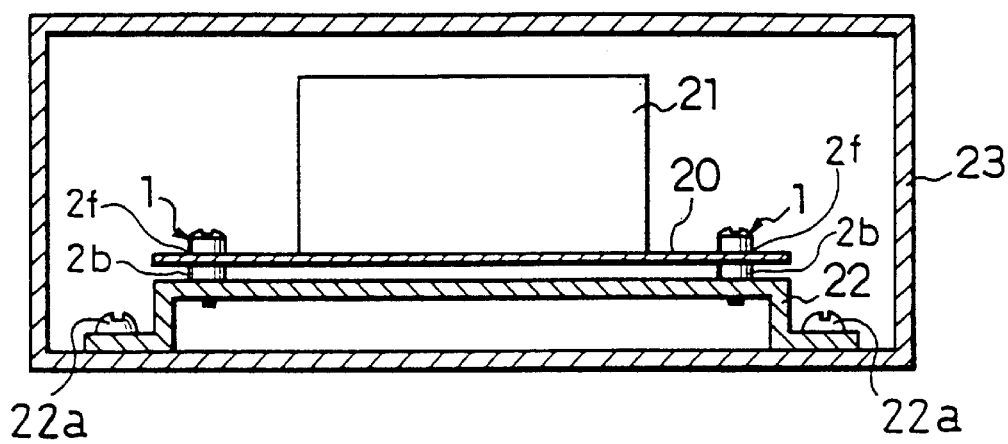
FIG. 1A is a cross-sectional side view of an example of a body of equipment including air dampers of the present invention.
Figure 1B:
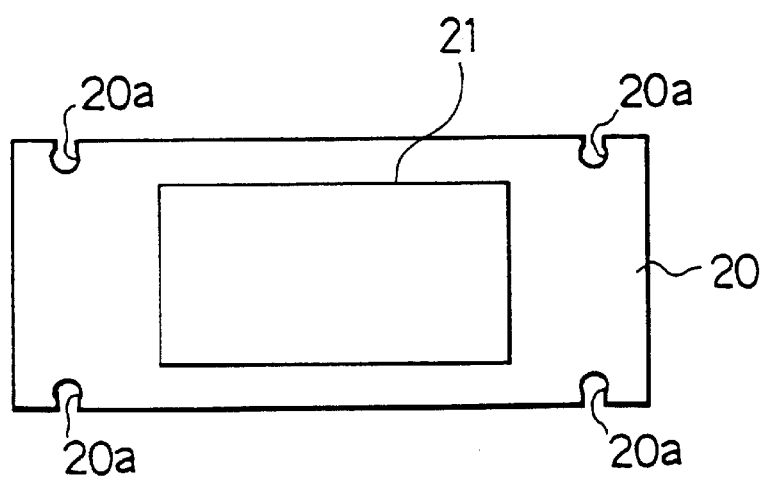
FIG. 1B is a plan view of a support board 20 shown in FIG. 1A.

FIG. 1A is a cross-sectional elevation view of an example of a body of equipment 23 using air dampers 1 in a first embodiment of the present invention. FIG. 1B is a plan view of a support board 20 shown in FIG. 1A. FIG. 2A is a side view, partly in cross-section, of the air damper 1. FIG. 2B is a side view, partly in cross-section, showing the state that the support board 20 mounted on the air damper 1 is depressed in the direction shown by an arrow A. FIG. 2C is a cross-sectional side view of a casing 2 of the air damper 1. The casing 2 includes cylindrical members 2a and 2b which are stacked in a manner of one above the other.

As shown in FIG. 1A, in the body of equipment 23, a precision electronic and mechanical component 21 to be supported is mounted on the support board 20. The support board 20 is mounted on intermediate sections 2f of four air dampers 1, and connected to a frame 22 through respective cylindrical members 2b. The support board 20, the frame 22 and the body of equipment 23 are preferably made of a metal or a resin. The precision electronic and mechanical component 21 is fixed to the support board 20 at a central portion with screws (not shown), for example. The frame 22 is fixed to the body of equipment 23 with screws 22a. The precision electronic and mechanical component 21 in the embodiment includes a magnetic disc device and DVD or CD disc drive or the like which are made in one unit and enclosed in a box.

As shown in FIG. 1B, U-shaped mounting holes 20a are formed at four corner portions of the support board 20. Four air damper 1 are mounted in the respective mounting holes 20a.

As shown in FIG. 2A through FIG. 2C, the air damper 1 comprises the cylindrical and hollow casing 2 made of an elastic material and a shoulder bolt 3 which is a fastening member for fixing the casing 2 to the frame 22 in a manner to make the casing 2 airtight. The material of the casing 2 is preferably butyl rubber, but urethane rubber and silicon rubber are also usable.

The deformation of these cylindrical members 2a and 2b results in damp of the shock given to the body of equipment 23 and absorption of vibration. The constricted intermediate section 2f having an outer diameter smaller than those of the cylindrical members 2a and 2b is formed between the cylindrical members 2a and 2b of the casing 2, and is inserted in the mounting hole 20a of the support board 20. The outer diameters of the cylindrical members 2a and 2b are changed in accordance with the weight of the precision electronic and mechanical component 21, and are in the range of 10 to 20 mm, for example. The outer diameter of the intermediate section 2f is in the range of 6 to 13 mm, for example.

The shoulder bolt 3 is preferably made of stainless steel, and is inserted in the casing 2 in the axial direction of the stacked cylindrical members 2a and 2b. The shoulder bolt 3 includes threads 3a at an end portion and a head 3h at the other end. A shank 3b having an outer diameter larger than the outer diameter of the threads 3a connects between the head 3h and the threads 3a. The outer diameter of the shank 3b is made smaller than the inner diameter 2d of the intermediate section 2f. A shoulder 3c is formed between the shank 3b and the threads 3a.

The cylindrical member 2a has a central opening 2g, and the cylindrical member 2b has a central opening 2h. The cylindrical member 2a includes a thin walled portion 2c reduced in thickness in comparison with other part around the central opening 2g. The inner diameter of the thin walled portion 2c, in other words, the diameter of the central opening 2g of the cylindrical member 2a is made smaller than the outer diameter of the shank 3b of the shoulder bolt 3. When the casing 2 is mounted on the frame 22 with the shoulder bolt 3, the shoulder bolt 3 is inserted into the central openings 2g and 2h. At this process, the thin walled portion 2c is folded inward and tightly contacts the outer face of the shank 3b of the shoulder bolt 3. In order to reduce a friction between the outer face of the shank 3b and the thin walled portion 2c, the outer face of the shank 3b may be coated with polytetrafluoroethylene, for example. The thickness of the thin walled portion 2c is 0.4 to 0.8 mm, for example, and is preferable one half of that of other portion of the casing 2.

The inner diameter of the thin walled portion 2c is in the range of 3 to 6 mm, and the outer diameter of the shank 3b is in the range of 5 to 10 mm, for example.

The cylindrical member 2b is mounted on the frame 22 with the shoulder bolt 3 in a manner that the outer surface closely contacts the surface of the frame 22. The cylindrical member 2b closely contacts the shoulder 3c of the shoulder bolt 3 at the inner surface adjacent to the central opening 2h, because the outer diameter of the shank 3b is larger than that of the central opening 2h. Consequently, in the air damper 1 of this embodiment, as shown in FIG. 2A, when the casing 2 is mounted on the frame 22 with the shoulder bolt 3, the casing 2 is made airtight, and therefore the air does not leak from the casing 2.

When shock or vibration is given to the body of equipment 23 and the air damper 1 has received an external force, the casing 2 deforms in the state of keeping airtight, and damps the shock and absorbs the vibration. When the support board 20 is temporarily depressed in the direction shown by the arrow A in FIG. 2B, for example, the cylindrical member 2b is pressed between the support board 20 and the frame 22 and deforms. When the cylindrical member 2b has deformed as shown in FIG. 2B, the upper face of the cylindrical member 2a comes out of contact with the lower face of the head 3h of the shoulder bolt 3. Since the cylindrical member 2a is depressed with tight contact between the thin walled portion 2c and the shank 3b, the casing 2 maintains the airtightness. Consequently, the casing 2 deforms in the state keeping airtight, and can damp the shock and can absorb the vibration caused by an external force.

When the air damper 1 of the first embodiment has received the vibration and shock due to an external force, the casing 2 deforms based on its intrinsic viscoelasticity, and damps the shock and absorbs the vibration. Additionally, the vibration or the shock having a large amplitude is also absorbed by the spring action of the air enclosed in the casing 2.

According to the air damper 1 of the embodiment, when the casing 2 is mounted on the frame 22 with the shoulder bolt 3, as shown in FIG. 2B, the thin walled portion 2c is folded inward along the shank 3b of the shoulder bolt 3 and closely contacts the outer surface thereof. Consequently, a contact area between the thin walled portion 2c and the shank 3b becomes wide. Even when the casing 2 is depressed downward, compressed and deformed by the external force applied to the support board 20, the airtightness is maintained between the thin walled portion 2c and the shoulder bolt 3, and the casing 2 is prevented from air leakage. As a result, the air damper 1 is capable of keeping the effect of a damper based on the above-mentioned air spring action.

In the air damper 1 of the first embodiment, an elastic member such as the compression coil spring in the prior art is not disposed in the casing 2. The air damper 1 damps the shock and absorbs the vibration by means of the deformation of the casing 2 and the spring action of the air enclosed therein. Therefore, the air damper 1 escapes from the occurrence of resonance due to the elastic member at reception of the vibration and shock. A resonance caused by the spring action of air is weaker than that of the elastic member, and the resonance frequency is relatively low. Therefore, the casing 2 can satisfactorily absorb the resonance with deformation thereof responding to the vibration and the shock. Since the coil spring or the like is not used, the casing 2 can be reduced in size, and the air damper 1 can be easily reduced in the size and weight.

Since the casing 2 is made airtight by the shoulder bolt 3, which avoids the need for a member to make the casing 2 airtight. Consequently, the structure of the air damper 1 can be simplified. According to the air damper of this embodiment, the casing 2 can be made airtight without the provision of the subframe to the body of equipment shown in the prior art. Therefore, the configurations of the air damper 1 and the body of equipment 23 can be simplified.

The structure of the casing 2 is not limited to two cylindrical members which are stacked in a manner of one above the other. The casing preferably has a structure that the casing is closed tightly with a fastening member such as a shoulder bolt. For example, the casing may be configured in a manner that three or more hollow members having rectangular cross-section are stacked to three or more stages and closed tightly by the fastening member for mounting on the frame of the body of equipment.

SECOND EMBODIMENT

FIG. 3A is a side view, partly in cross-section, of an air damper 4 of a second embodiment in the present invention. FIG. 3B is a side view, partly in cross-section, showing the state that the support board 20 mounted on the air damper 4 is depressed in the direction of an arrow A. FIG. 3C is a cross-sectional side view of a casing 5 of the air camper 4. The air damper 4 includes bellows 5a capable of expanding and contracting in the axial direction, as replacement for the cylindrical member 2a of the air damper 1 in the first embodiment. The other configurations are the same as those of the first embodiment.

As shown in FIG. 3A to FIG. 3C, a cylindrical member 5b is disposed at the lower stage of the bellows 5a. The bellows 5a includes a thin walled portion 5c closely contacting the shank 3b of the shoulder bolt 3, in a manner similar to that of the first embodiment.

In the air damper 4 of this embodiment, when the casing 5 is mounted on the frame 22 in a manner that the casing 5 is closed tightly by the shoulder bolt 3, the bellows 5a is in the state compressed and deformed. In other words, the casing 5 is mounted on the frame 22 in a manner that the mounting height H1 of the casing 5 in FIG. 3A is smaller than the natural height H2 of the casing 5 in FIG. 3C.

When the support board 20 has been temporarily depressed by an external force in the direction shown by the arrow A in FIG. 3B, and the cylindrical member 5b has been temporarily compressed, the bellows 5a expands in the axial direction due to restoration to the original height H2. Therefore, even when the cylindrical member 5b is compressed, the thin walled portion 5c does not move along the shank 3b, and the upper face of the casing 5 maintains the contact to the lower face of the head 3h of the shoulder bolt 3. Consequently, the casing 5 of the third embodiment is effectively prevented from air leakage in comparison with that of the first embodiment, and the bellows 5a is capable of maintaining the cushion-like function of air at all times.

Incidentally, the positional relation between the bellows 5a and the cylindrical member 5b may be reversed in the up and down direction and. stacked in a manner of one above the other. The up and down members of the casing 5 may be configured by the bellows 5a.

THIRD EMBODIMENT

Figure 4A:
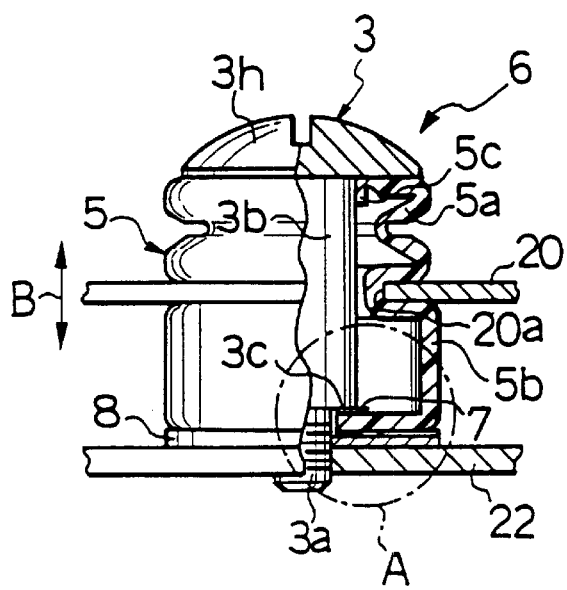
FIG. 4A is a side view, partly in cross-section, of an air damper 6 in a third embodiment of the present invention.
Figure 4B:
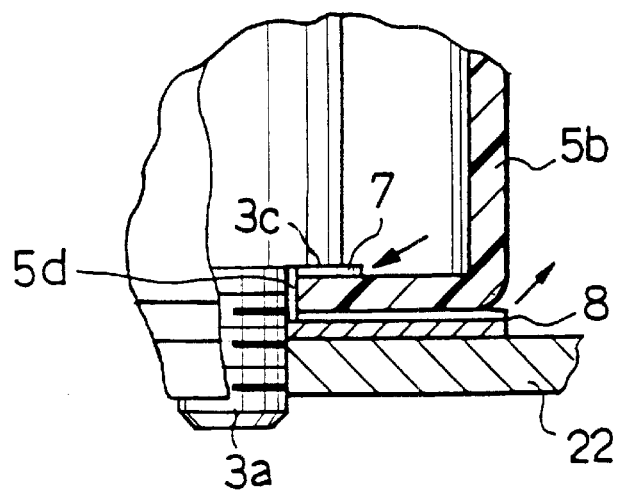
FIG. 4B is an enlarged cross-sectional side view of a region encircled by a chain line A in FIG. 4A.

FIG. 4A is a side view, partly in cross-section, of an air damper 6 of a third embodiment in the present invention. FIG. 4B is an enlarged cross-sectional side view of the region encircled by a chain line A in FIG. 4A. The air damper 6 of the third embodiment includes an air passage (hereinafter is referred to as orifice) to communicate between the interior and the outside of the casing 5 as described bellow in detail. The other configurations are similar to those of the second embodiment.

In the third embodiment, the casing 5 is configured in a manner that when the support board 20 moves as shown by an arrow B due to extraneous vibration, the capacity of the casing 5 increases or decreases corresponding to a moving direction of the support board 20. In other words, the bellows 5a and the cylindrical member 5b of the casing 5 are configured in a manner that the capacity change of the bellows 5a by a predetermined distance of movement of the support board 20 in a direction of the arrow B is smaller than the capacity change of the cylindrical member 5b.

As shown in FIG. 4B, the air damper 6 of this embodiment includes a plain washer 7 between the inner face of the lower end of the cylindrical member 5b and the shoulder 3c of the shoulder bolt 3. Furthermore, a ring 8 is disposed between a frame 22 and the outer face of the lower end of the cylindrical member 5b. Configurations of the plain washer 7 and the ring 8 are described in detail with reference to FIG. 5A to FIG. 5D.

Figure 5A:
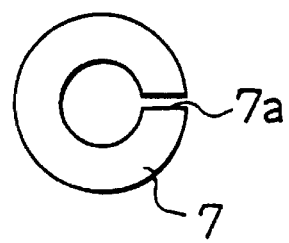
FIG. 5A is a plan view of a plain washer 7 shown in FIG. 4B.
Figure 5B:
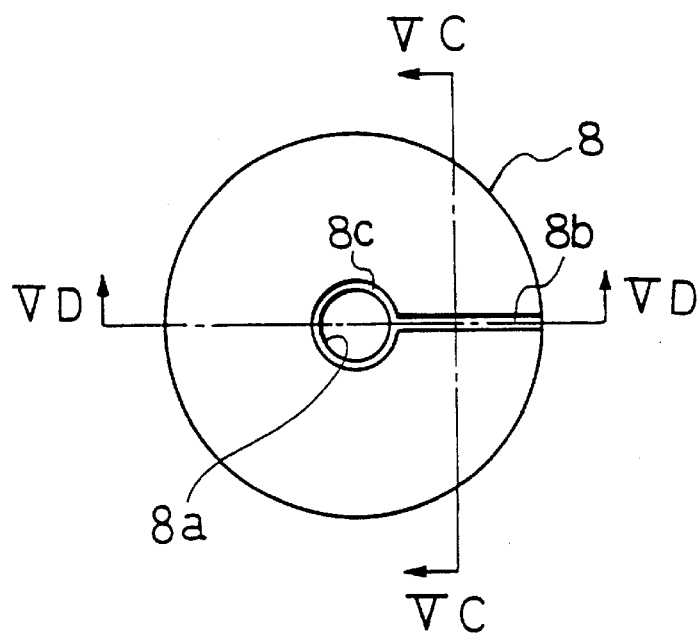
FIG. 5B is a plan view of a ring 8 shown in FIG. 4B.
Figure 5C:
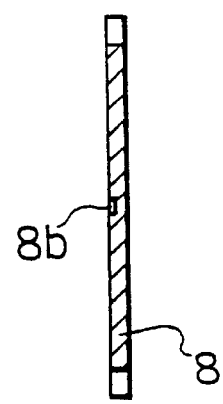
FIG. 5C is a cross-sectional side view of the ring 8 of FIG. 5B taken along the line $V_C-V_C$.
Figure 5D:
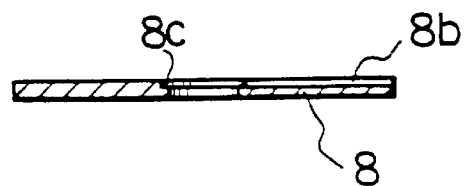
FIG. 5D is a cross-sectional side view of the ring 8 of FIG. 5B taken along the line $V_D-V_D$.

FIG. 5A is a plan view of the plain washer 7. FIG. 5B is a plan view of the ring 8. FIG. 5C is a cross-sectional view of the ring 8 taken along the line $V_C$—$V_C$ in FIG. 5B. FIG. 5D is a cross-sectional view of the ring 8 taken along the line $V_D$—$V_D$ in FIG. 5B.

As shown in FIG. 5A, the plain washer 7 is configured to a C-shape having a cut part 7a, and the inner diameter thereof is made larger than the outer diameter of the thread portion 3a of the shoulder bolt 3. The plain washer 7 is preferably made of a metal such as stainless steel. The plain washer 7 is placed in the cylindrical member 5b prior to assembly of the casing 5 as shown in FIG. 4A. The diameter of the lower opening 5d of the cylindrical member 5b is larger than the outer diameter of the thread portion 3a of the shoulder bolt 3.

As shown in FIG. 5B to FIG. 5D, the ring 8 is configured by a circular thin-plate having a central opening 8a through which the thread portion 3a of the shoulder bolt 3 is inserted. Although the ring 8 is preferably made of a metal such as stainless steel, the ring 8 maybe made of an engineering plastics such as a polyacetal resin for cost reduction purposes. The ring 8 includes a groove 8b and a circular dent part 8c on the face which closely contacts the lower face of the cylindrical member 5b. The dent part 8c may be formed by denting a circular region encircling the central opening 8a. The groove 8b communicates with the dent part 8c at one end and reaches the periphery of the ring 8 at the other end.

When the air damper 6 of this embodiment is assembled, the cut part 7a of the plain washer 7 and the groove 8b and the dent part 8c of the ring 8 communicate with the space between the central opening 5d and the thread-portion 3a, thereby forming an orifice. The interior of the casing 5 communicates with the outside through the orifice. When the support board 20 moves as shown by the arrow B, the capacity of the casing 5 decreases or increases corresponding to the moving direction of the support board 20, and the air in the casing 5 is discharged outward or outside air flows into the casing through the orifice Consequently, the vibration and shock are braked, softened and absorbed by a resistance of air passing through the orifice. The performance of absorbing the vibration and shock can be improved.

The air damper 6 of this embodiment is capable of damping and absorbing the shock and vibration within a shorter period of time in comparison with those of the first and second embodiments. In the first embodiment, the air enclosed in the casing 2 is compressed by deformation of the casing 2 in a short period of time, and subsequently expands to restore to the original state. The air alternates compression and expansion, and moves in the casing 2. Therefore, it requires a relatively long period of time to absorb the vibration and the shock.

According to the air damper 6 of this embodiment, the air in the casing 5 is discharged outward or outside air is sucked into the casing 5 responding to deformation of the casing 5 through the orifice. Consequently, vibration due to alternating compression and expansion is suppressed, and the shock is damped within a short period of time and the vibration can be rapidly absorbed.

A flow rate of the air passing through the orifice can be varied by changing the width or the depth of the groove 8b. The air spring action is easily varied by adjusting the flow rate of the air. The lower end of the cylindrical member 5b is clamped between the plain washer 7 and the ring 8. Therefore, when the casing 5 deforms responding to the vibration or the shock, the lower face of the cylindrical member 5b does not dislocate on the ring 8. The air passage of the orifice does not change, and a stable air resistance effect is maintained by means of the orifice.

Incidentally, in the above-mentioned description, although the separate ring 8 is mounted on the frame 22, the ring 8 may be formed on the frame 22 in one body.

FOURTH EMBODIMENT

Figure 6A:
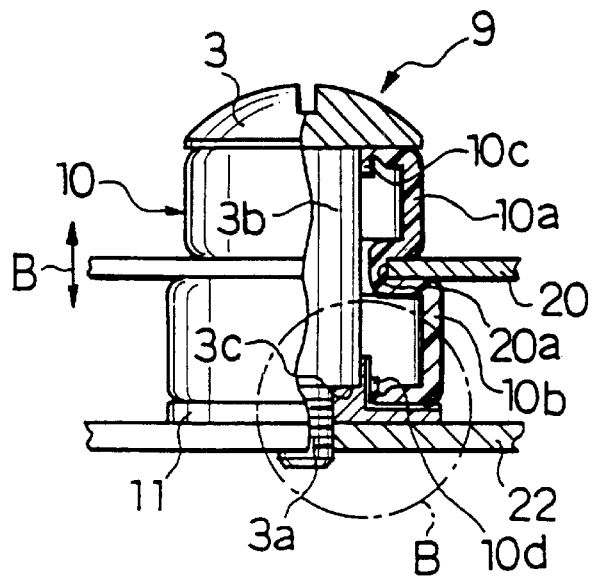
FIG. 6A is a side view, partly in cross-section, of an air damper 9 in a fourth embodiment of the present invention.
Figure 6B:
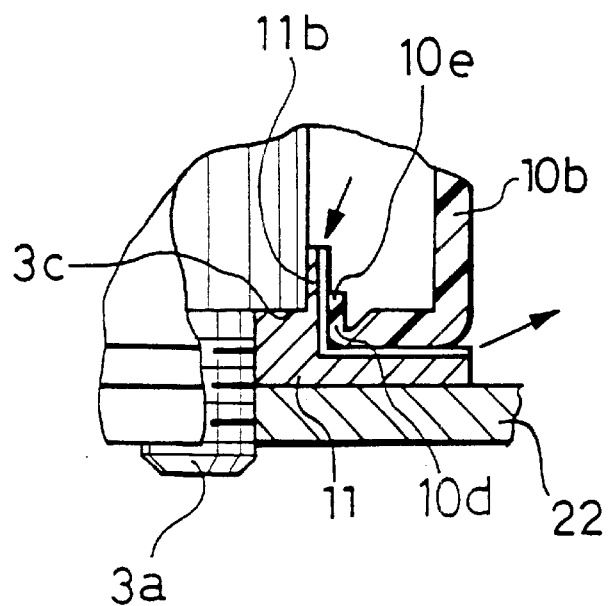
FIG. 6B is an enlarged cross-sectional side view of a region encircled by a chain line B in FIG. 6A.
Figure 7A:
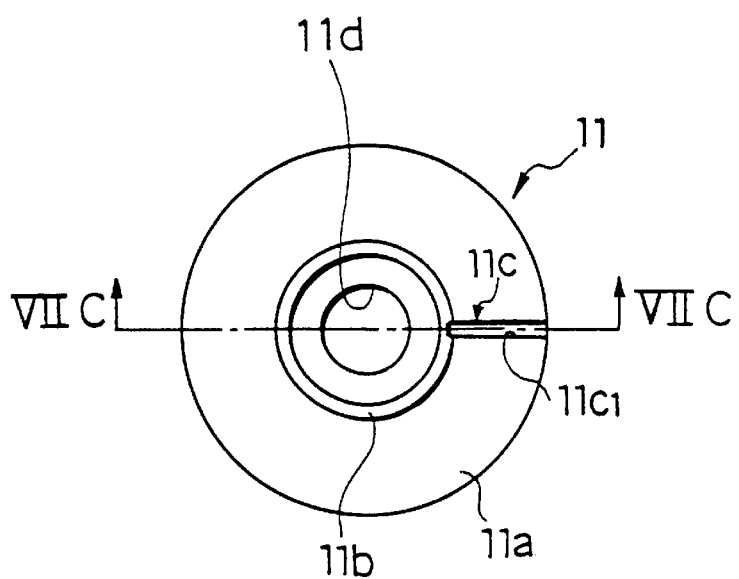
FIG. 7A is a plan view of a base 11 shown in FIG. 6B.
Figure 7B:
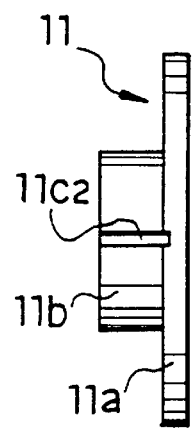
FIG. 7B is a side view of the base 11.
Figure 7C:
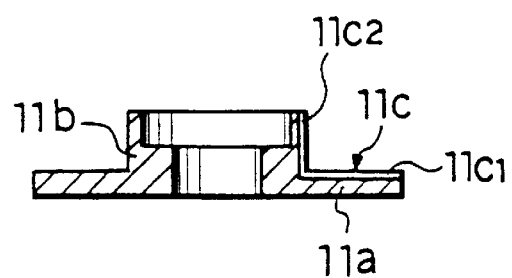
FIG. 7C is a cross-sectional side view of the base 11 taken along the line $VII_C-VII_C$ in FIG. 7A.

FIG. 6A is a side view, partly in cross-section, of an air damper 9 of a fourth embodiment in the present invention. FIG. 6B is an enlarged cross-sectional side view of the region encircled by a chain line B in FIG. 6A. In the fourth embodiment, a casing 10 includes a cylindrical member 10a and a cylindrical member 10b, and the support board 20 is suspended between the cylindrical members 10a and 10b. A base member 11 is placed between the cylindrical member 10b and the frame 22. The base member 11 includes a flange 11a and a boss 11b as shown in FIG. 7A to FIG. 7C.

As shown in FIG. 6A and FIG. 6B, the cylindrical member 10b of the air damper 9 includes a thin walled portion 10d encircling a central opening 10e thereof. When the cylindrical member 10b is assembled to the base member 11, the thin walled portion 10d makes airtight contact with the outer surface of a boss 11b of the base member 11. The respective inner diameters of the cylindrical member 10a and the cylindrical member 10b are made different with each other. Consequently, when the support board 20 moves as shown by the arrow B, the capacity of the casing 10 increases or decreases corresponding to the moving direction of the support board 20. In FIG. 6A, the inner diameter of the cylindrical member 10a is made smaller than that of the cylindrical member 10b. Therefore, when the support board 20 moves upward in FIG. 6A, the capacity of the casing 10 increases, and when the support board 20 moves downward, the capacity of the casing 10 decreases. Remaining configuration is substantially identical with that of the first embodiment, and therefore the description is omitted. The base member 11 is preferably made of a metal such as stainless steel. The base member 11 may be made of an engineering plastics such as a polyacetal resin for cost reduction purposes. When the casing 10 has been mounted on the frame 22 with the shoulder bolt 3, the base member 11 makes airtight contact with the shoulder 3c and the shank 3b of the shoulder bolt 3.

The structure of the base member 11 is described in detail with reference to FIG. 7A to FIG. 7C. FIG. 7A is a plan view of the base member 11. FIG. 7B is a side view of the base member 11. FIG. 7C is a cross-sectional view of the base member 11 taken along the line VII$_C$—VII$_C$ in FIG. 7A. The outer diameter of the boss 11b is made larger than the diameter of the central opening 10e of the cylindrical member 10b, namely the inner diameter of the thin walled portion 10d. When the boss 11b is inserted into the central opening 10e, the thin walled portion 10d is folded inside of the casing 10 as shown in FIG. 6B, and the folded thin walled portion 10d makes airtight contact with the outer surface of the boss 11b.

A small groove 11c is formed on the surfaces of the flange 11a and the boss 11b of the base member 11. The groove 11c includes grooves 11c1 and 11c2. The groove 11c1 is formed on the upper face of the flange 11a in the radial direction. The groove 11c2 is formed on the outer face of the boss 11b along the axis of the boss 11b, and communicates with the groove 11c1 at the lower end. As shown in FIG. 6A, the base member 11 is assembled to the casing 10 and the groove 11c serves as an air passage (orifice) communicating between the casing 10 and the outside thereof. When the casing 10 deforms due to extraneous vibration or shock, the air in the casing 10 is discharged out or the air flows into the casing 10 through the groove 11c. Consequently, the vibration and the shock are braked, softened and absorbed by a resistance of air flowing through the orifice, and the performance for absorbing the vibration and shock can be improved. The air damper 9 of the fourth embodiment is capable of absorbing the vibration and the shock within a shorter period of time in comparison with those of the first and second embodiments.

A flow rate of the air flowing through the orifice is adjustable by changing the width or the depth of the groove 11c. Consequently, the air spring action is easily varied. The thin walled portion 10d of the cylindrical member 10b of the casing 10 closely contacts the boss 11b of the base member 11. Therefore, even when the casing 10 has deformed due to vibration or shock, the lower surface of the cylindrical member 10b does not dislocate on the base member 11. Consequently, a stable braking effect based on the air resistance is realizable by means of the groove 11c.

In the air damper 9 of this embodiment, the number of parts decreases in comparison with that of the third embodiment, because the plain washer 7 is not used. Therefore, the assembly work of the precision electronic and mechanical component becomes easy. The base member 11 may be formed on the surface of the frame 22 in one body.

INDUSTRIAL APPLICABILITY

In the air damper of the present invention, when the casing is mounted on the frame of a body of equipment with the shoulder bolt as a fastening member, the casing is made airtight and air is enclosed therein. When the air damper has received an external force due to extraneous vibration and shock, the casing deforms according to intrinsic viscoelasticity of the material, and damps the shock and absorbs the vibration. When the air damper receives the vibration or shock having a large amplitude, a cushion-like effect of the air enclosed in the casing is cooperated with the above-mentioned vibration absorption based on the viscoelasticity, and damping effect is further improved.

The air damper of other aspect of the invention, in addition to the configuration of the above-mentioned invention, comprises the orifice which communicates the interior of the casing with the outside and gives a resistance to air flowing between the interior and the outside. And thereby, in addition to the above-mentioned effect, an absorption characteristic of the vibration and the shock is improved by braking effect caused by the resistance of air flowing the orifice, and the vibration and the shock can be absorbed within a short period of time.

What is claimed is:

1. In an air damper to be mounted between a support board having an object to be supported and a frame fixed to a body of equipment, the air damper comprising:

a casing made of an elastic material, including at least two box shaped parts with hollow spaces stacked in the manner at least two box shaped parts vertically one above the other, supporting said support board between said at least two box shaped parts wherein the lowest box shaped part makes close contact with said frame, and a fastening member for mounting said casing on said frame with airtightness, inserted vertically into said casing, wherein said fastening member is a shoulder bolt having a thread section disposed at an end portion, a shank having an outer diameter larger than the outer diameter of said thread section, and a shoulder which is an end face of the shank in the thread section side, and when said thread section is attached to said frame through the interior of said casing, said shoulder makes contact with airtightness with the inner surface of the box shaped parts of the lower step, and said shank makes contact with airtightness with the hollow member of the highest step, and thereby closing said casing with airtightness.

2. An air damper in accordance with claim 1, wherein the diameter of an opening of said box shaped part of said highest step through which said shoulder bolt is inserted is made smaller that the outer diameter of said shank, and a thin walled portion reduced in thickness in comparison with other portion is formed around said opening so as to be deformed and closely contact to the outer face of said shank.

3. An air damper in accordance with claim 2, wherein at least one of said upper and lower box shaped parts has a bellows permitting expansion and contraction in said vertical direction.

4. An air damper in accordance with claim 1, wherein said fastening member is a shoulder bolt having a thread section disposed at an end portion, a shank having an outer diameter larger than the outer diameter of said thread section, and a shoulder which is an end face of the shank in the thread section side, and when said thread section is attached to said frame through the interior of said casing, said shoulder makes contact with airtightness with the inner surface of the box shaped parts of the lowest step, and said shank makes contact with airtightness with the hollow member of the highest step, and thereby closing said casing with airtightness.

5. An air damper in accordance with claim 1, wherein at least one of said box shaped parts is bellows permitting expansion and contraction in said vertical direction.

6. An air damper comprising;

a casing including at least two box shaped parts of an upper box shaped part and a lower box shaped part with hollow spaces made of an elastic material and connected through an intermediate section having a communication opening, for supporting a support member having an object to be supported at said intermediate section, and said upper box shaped part including: a thin walled portion of a predetermined diameter at an end part of said upper box shaped part, which is deformed in assembled state, and an upper opening having a smaller. diameter than that of said thin walled portion, at the central part of said thin walled portion, and said lower box shaped part including: a lower opening being smaller than said predetermined diameter at end part thereof, a fastening member including:
  a shank having a diameter substantially identical with the diameter of said thin walled portion,
  a shoulder having a diameter larger than the diameter of said lower opening and forcing the inner surface of said lower box shaped part to a frame to be mounted, and
  threads having a diameter smaller than the diameter of said lower opening, formed on said shoulder, and said shoulder fixing the periphery of said lower opening on said frame with airtightness by inserting said shank into said upper opening, the communication opening and the lower opening of said casing and attaching said threads to a frame.

7. An air damper in accordance with claim 6, therein said casing is configured so that when the support board moves in the axial direction of the casing, the capacity of the casing increases or decreases corresponding to the moving direction of the support board, and an air passage is included to communicate the interior of said casing with the outside of said casing.

8. An air damper in accordance with claim 7, further comprising:
  a base member having a cylindrical portion inserted into said lower box shaped part so as to closely contact with the opening of said lower box shaped part, and a disc-shaped portion contacting closely with said lower box shaped part and said frame, whereby
  said air passage is configured by a first groove formed on an outer face of said cylindrical portion along the central axis of said cylindrical portion and a second groove formed on said disc-shaped portion, communicated with said first groove at one end and reaches the peripheral face of said disc-shaped portion at another end.

9. An air damper in accordance with claim 8, wherein said lower box shaped part includes an opening for inserting and the cylindrical portion of said base member, having a diameter smaller that the outer diameter of said cylindrical member, and a thin walled portion having a thickness thinner than other portion, formed around said opening so as to closely contact the shank of said fixing member.

10. An air damper in accordance with claim 7, further comprising:
  a plain washer having a cut part in a radial direction, and disposed between said shoulder and an inside face of the lowest box shaped part, and
  a ring placed between said frame and the outside face of the lowest box shaped part having
    a central opening for inserting said shoulder bolt,
    a circular dent part formed around said central opening on the surface of the ring being in close contact with the outer face of said box shaped part, and
    a groove communicating with said dent part at one end, and reaching the peripheral face of said ring at another end,
      whereby said air passage is formed by said cut part, the gap between said end portion and said central opening, said dent part and said groove.

11. An air damper in accordance with claim 6, wherein at least one of said upper and lower box shaped parts is bellows permitting expansion and contraction in said vertical direction.

12. In an air damper to be mounted between a support board having an object to be supported and a frame fixed to a body of equipment, the air damper comprising:

a casing made of elastic material, including at least two box shaped parts with hollow spaces stacked in the manner at least two box shaped parts vertically one above the other, supporting said support board between said at least two box shaped parts wherein the lowest box shaped part makes close contact with said frame, and a fastening member for mounting said casing on said frame with airtightness, inserted vertically into said casing, wherein said fastening member is a shoulder bolt having a thread section disposed at an end portion, a shank having an outer diameter larger than the outer diameter of said thread section, and a shoulder which is an end face of the shank in the thread section side,
  when said thread section is attached to said frame through the interior of said casing, said shoulder makes contact with airtightness with the inner surface of the box shaped parts of the lowest step, and said shank makes contact with airtightness with the hollow member of the highest step, and thereby closing said casing with airtightness, and
  said casing is configured so that when the support board moves in the axial direction of the casing, the capacity of the casing increases or decreases corresponding to the moving direction of the support board, and an air passage is included to communicate the interior of said casing with the outside of said casing.

13. An air damper in accordance with claim 12, further comprising:
  a base member having a cylindrical portion inserted into said lowest box shaped part so as to closely contact with the opening of said box shaped part, and a disc-shaped portion contacting closely with said box shaped part and said frame, whereby
  said air passage is configured by a first groove formed on an outer face of said cylindrical portion along the central axis of said cylindrical portion and a second groove formed on said disc-shaped portion, communicated with said first groove at one end and reaches the peripheral face of said disc-shaped portion at another end.

14. An air damper in accordance with claim 13, wherein said lowest box shaped part includes an opening for inserting the cylindrical portion of said base member, having a diameter smaller than the outer diameter of said cylindrical member, and a thin walled portion having a thickness thinner than other portion, formed around said opening so as to closely contact the shank of said fixing member.

15. An air damper in accordance with claim 12, further comprising:
  a plain washer having a cut part in a radial direction, and disposed between said shoulder and an inside face of the lowest hollow member, and
  a ring placed between said frame and the outside face of the lowest hollow member having
    a central opening for inserting said shoulder bolt,
    a circular dent part formed around said central opening on the surface of the ring being in close contact with the outer face of said box shaped part, and
    a groove communicating with said dent part at one end, and reaching the peripheral face of said ring at another end,
      whereby said air passage is formed by said cut part, the gap between said end portion and said central opening, said dent part and said groove.

* * * * *

UNITED STATES PATENT AND TRADEMARK OFFICE
CERTIFICATE OF CORRECTION

PATENT NO.     : 6,402,129 B1
DATED          : June 11, 2002
INVENTOR(S)    : Tani It is certified that error appears in the above-identified patent and that said Letters Patent is hereby corrected as shown below:

Column 6,
Line 59, please delete "and." and insert therefor -- and --.

Column 7,
Line 55, please delete "space-" and insert therefor -- space --.

Column 10,
Line 39, please delete lines 39 through 51, beginning with "4. An air damper in accordance with…" ending with "airtightness.".
Line 66, please delete "smaller." and insert therefor -- smaller --.

Column 11,
Line 17, please delete "therein" and insert therefor -- wherein --.

Signed and Sealed this

Third Day of June, 2003

JAMES E. ROGAN
*Director of the United States Patent and Trademark Office*